United States Patent
Kim et al.

(10) Patent No.: US 12,384,268 B2
(45) Date of Patent: Aug. 12, 2025

(54) WIRELESS CHARGING VEHICLE AND WIRELESS CHARGING METHOD THEREOF

(71) Applicants: Hyundai Motor Company, Seoul (KR); Kia Corporation, Seoul (KR); INDUSTRY ACADEMIC COOPERATION FOUNDATION KEIMYUNG UNIVERSITY, Daegu (KR)

(72) Inventors: Zeung Il Kim, Hwaseong-si (KR); JinSu Jang, Suwon-si (KR); TaekHyun Jung, Seoul (KR); Seungmok Lee, Daegu (KR); Hae Joon Jo, Daegu (KR)

(73) Assignees: HYUNDAI MOTOR COMPANY, Seoul (KR); KIA CORPORATION, Seoul (KR); INDUSTRY ACADEMIC COOPERATION FOUNDATION KEIMYUNG UNIVERSITY, Daegu (KR)

( * ) Notice: Subject to any disclaimer, the term of this patent is extended or adjusted under 35 U.S.C. 154(b) by 271 days.

(21) Appl. No.: 17/667,341

(22) Filed: Feb. 8, 2022

(65) Prior Publication Data
US 2023/0040294 A1     Feb. 9, 2023

(30) Foreign Application Priority Data
Aug. 3, 2021 (KR) .......................... 10-2021-0101799

(51) Int. Cl.
*B60L 53/00* (2019.01)
*B60L 53/12* (2019.01)
(Continued)

(52) U.S. Cl.
CPC ............... *B60L 53/36* (2019.02); *B60L 53/12* (2019.02); *G01C 22/00* (2013.01);
(Continued)

(58) Field of Classification Search
CPC .......... B60L 53/36; B60L 53/39; B60L 53/12; B60L 53/126; B60L 2240/62;
(Continued)

(56) References Cited

U.S. PATENT DOCUMENTS

| | | | |
|---|---|---|---|
| 8,483,899 B2 * | 7/2013 | Martin .................. | B60L 53/36 320/109 |
| 10,343,535 B2 | 7/2019 | Cook et al. | |

(Continued)

FOREIGN PATENT DOCUMENTS

| | | |
|---|---|---|
| KR | 1020210025741 A | 3/2021 |
| KR | 102268919 B1 | 6/2021 |
| WO | 2021101223 A1 | 5/2021 |

OTHER PUBLICATIONS

Ridolfi, M.; Vandermeeren, S.; Defraye, J.; Steendam, H.; Gerlo, J.; De Clercq, D.; Hoebeke, J.; De Poorter, E. Experimental Evaluation of UWB Indoor Positioning for Sport Postures. Sensors 2018, 18, 168. https://doi.org/10.3390/s18010168 (Year: 2018).*

(Continued)

*Primary Examiner* — Anne Marie Antonucci
*Assistant Examiner* — Jordan T Smith
(74) *Attorney, Agent, or Firm* — Slater Matsil, LLP

(57) ABSTRACT

An embodiment wireless charging vehicle includes a secondary charging pad configured to generate an induced current by a magnetic field generated to a primary charging pad of a wireless charging station and to charge a battery, a plurality of ultra-wideband (UWB) tags disposed to surround the vehicle, and a UWB controller configured to perform a wireless charging arrangement mode for arranging the secondary charging pad on the primary charging pad by using a sensor value measured by the UWB tags, wherein the UWB controller is configured to calculate a coordinate of the primary charging pad by using a line of sight (LOS)

(Continued)

sensor value of a UWB tag having a line of sight from among the UWB tags.

20 Claims, 7 Drawing Sheets

(51) Int. Cl.
    *B60L 53/36*     (2019.01)
    *G01C 22/00*     (2006.01)
    *H02J 7/00*     (2006.01)
    *H02J 50/10*     (2016.01)
    *H02J 50/80*     (2016.01)
    *H02J 50/90*     (2016.01)
    *H04W 4/80*     (2018.01)

(52) U.S. Cl.
    CPC .......... *H02J 7/00032* (2020.01); *H02J 7/007* (2013.01); *H02J 50/10* (2016.02); *H02J 50/80* (2016.02); *H02J 50/90* (2016.02); *H04W 4/80* (2018.02)

(58) Field of Classification Search
    CPC ...... B60L 53/38; G01C 22/00; H02J 7/00032; H02J 7/007; H02J 50/10; H02J 50/80; H02J 50/90; H04W 4/80; H04W 4/44; Y02T 10/70; Y02T 10/7072; Y02T 90/12; Y02T 90/14; Y02T 10/62; B60Y 2200/91
    See application file for complete search history.

(56) References Cited

U.S. PATENT DOCUMENTS

| | | | |
|---|---|---|---|
| 10,869,161 B2* | 12/2020 | Smith | H04W 4/029 |
| 2016/0349362 A1* | 12/2016 | Rohr | G01S 13/86 |
| 2017/0174093 A1* | 6/2017 | Oettle | B60L 53/31 |
| 2017/0361726 A1* | 12/2017 | Widmer | G01S 19/45 |
| 2020/0307403 A1* | 10/2020 | Rastoll | B60L 53/66 |
| 2022/0416860 A1* | 12/2022 | Hochdorf | B64C 39/024 |
| 2023/0194695 A1* | 6/2023 | Janssens | G01S 13/76 |
| | | | 342/27 |
| 2023/0341499 A1* | 10/2023 | Chen | G01S 13/46 |

OTHER PUBLICATIONS

Khalaf-Allah, M. Particle Filtering for Three-Dimensional TDoA-Based Positioning Using Four Anchor Nodes. Sensors 2020, 20, 4516. https://doi.org/10.3390/s20164516 (Year: 2020).*

J. Hyun, T. Oh, H. Lim and H. Myung, "UWB-based Indoor Localization Using Ray-tracing Algorithm," 2019 16th International Conference on Ubiquitous Robots (UR), Jeju, Korea (South), 2019, pp. 98-101, doi: 10.1109/URAI.2019.8768568. (Year: 2019).*

* cited by examiner

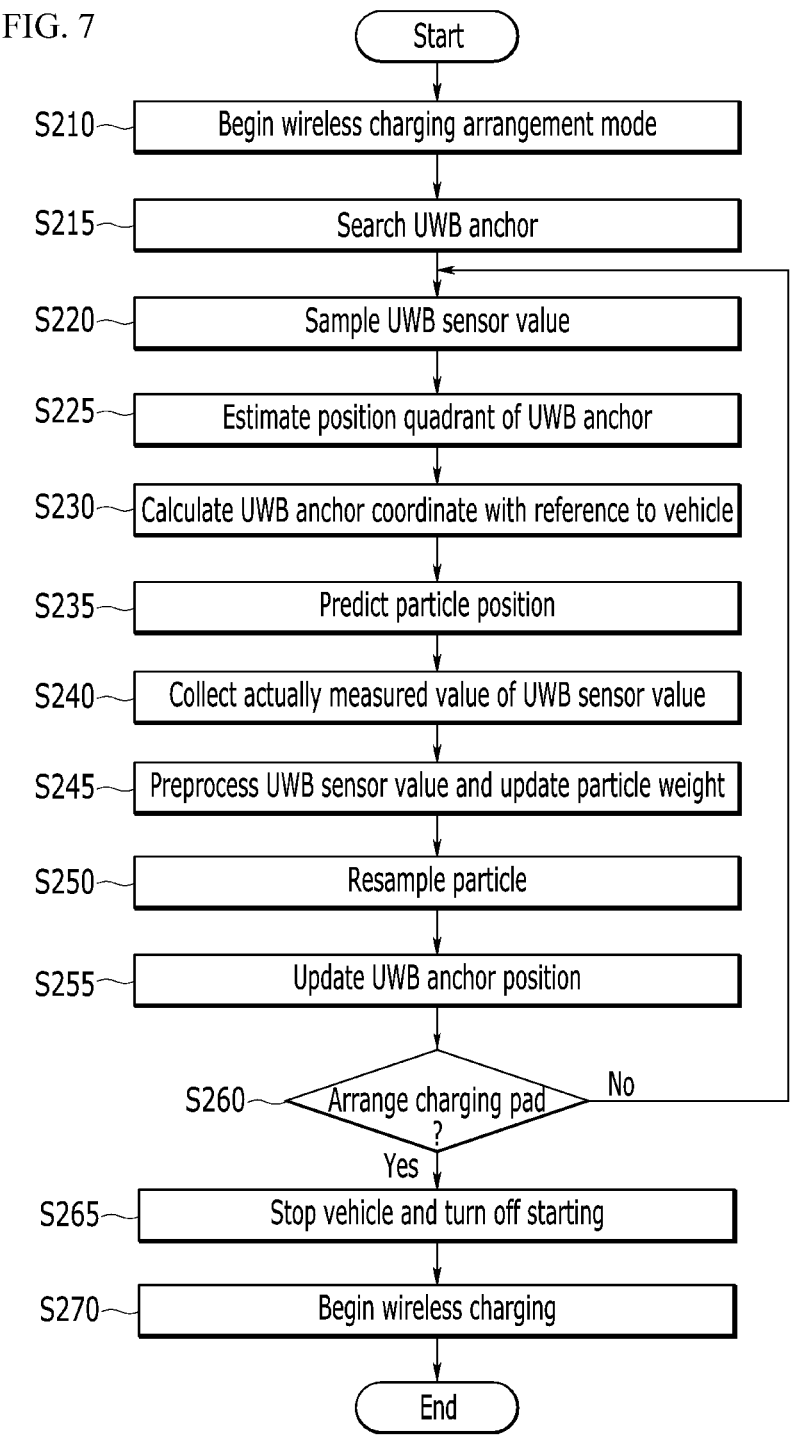

WIRELESS CHARGING VEHICLE AND WIRELESS CHARGING METHOD THEREOF

CROSS-REFERENCE TO RELATED APPLICATIONS

This application claims the benefit of Korean Patent Application No. 10-2021-0101799, filed on Aug. 3, 2021, which application is hereby incorporated herein by reference.

TECHNICAL FIELD

Embodiments of the present invention relate to a wireless charging vehicle and a wireless charging method thereof.

BACKGROUND

An electric vehicle charging system charges a battery mounted on an electric vehicle by using grids of a power voltage to be used or power of an energy storage device. The electric vehicle charging system may have various forms depending on types of the electric vehicles. For example, the electric vehicle charging system may include a conductive charging system using cables or a non-contact type of wireless charging system. In general, a wireless charging by the wireless charging system represents a method for charging the battery by allowing a current to flow through electromagnetic induction, wherein a magnetic field generated by the current flowing to a primary coil of a charger generates an induced current to a secondary coil of the battery, and the induced current charges the battery.

When convenience of charging autonomous vehicles or electric vehicles is considered, the wireless charging system is one of essential charging skills, and in order to achieve optimal charging efficiency, a precise arrangement between a primary charging pad of a wireless charger for transmitting a power voltage and a secondary charging pad of a vehicle for receiving the power voltage is essential.

The above information disclosed in this Background section is only for enhancement of understanding of the background of the invention, and therefore it may contain information that does not form the prior art that is already known to a person of ordinary skill in the art.

SUMMARY

Embodiments of the present invention relate to a wireless charging vehicle and a wireless charging method thereof. Particular embodiments relate to a wireless charging vehicle for performing an arrangement of positions between a vehicle and a wireless charger, and a wireless charging method thereof.

Embodiments of the present invention provide a wireless charging vehicle for allowing a precise arrangement between a primary charging pad of a wireless charger and a secondary charging pad of a vehicle, and a wireless charging method thereof.

An embodiment of the present invention provides a wireless charging vehicle including a secondary charging pad for generating an induced current by a magnetic field generated to a primary charging pad of a wireless charging station and for charging a battery, a plurality of ultra-wideband (UWB) tags disposed to surround a vehicle, and a UWB controller for performing a wireless charging arrangement mode for arranging the secondary charging pad on the primary charging pad by using a sensor value measured by the UWB tags, wherein the UWB controller calculates a coordinate of the primary charging pad by using a line of sight (LOS) sensor value of a UWB tag having a line of sight from among the UWB tags.

The UWB controller may compare UWB signals of the respective UWB tags and determine a position quadrant in which the primary charging pad is disposed, and may distinguish a UWB tag obtaining a line of sight and a UWB tag not obtaining a line of sight based on the position quadrant.

The UWB controller may combine odometry information and a LOS sensor value according to movement of the vehicle to update a vehicle position.

The UWB controller may update the vehicle position by using an extended Kalman filter and a particle filter scheme.

Another embodiment of the present invention provides a wireless charging method of a wireless charging vehicle, the method including comparing UWB signals received by a plurality of respective UWB tags and determining a position quadrant in which a UWB anchor is disposed, calculating a coordinate of the UWB anchor by using a LOS sensor value of the UWB tag obtaining a line of sight based on the position quadrant, and moving toward the UWB anchor based on the coordinate of the UWB anchor.

The wireless charging method may further include combining odometry information according to moving of a vehicle and a LOS sensor value and updating a vehicle position.

The vehicle position may be updated by using an extended Kalman filter and a particle filter scheme.

The position of the primary charging pad of the wireless charger may be found from a distance by using the UWB sensor applied to the vehicle, and the precise arrangement between the primary charging pad of the wireless charger and the secondary charging pad of the vehicle may be performed.

BRIEF DESCRIPTION OF THE DRAWINGS

FIG. 7 shows a flowchart of a wireless charging method of a wireless charging vehicle according to another embodiment of the present invention.

DETAILED DESCRIPTION OF ILLUSTRATIVE EMBODIMENTS

Figure 1:
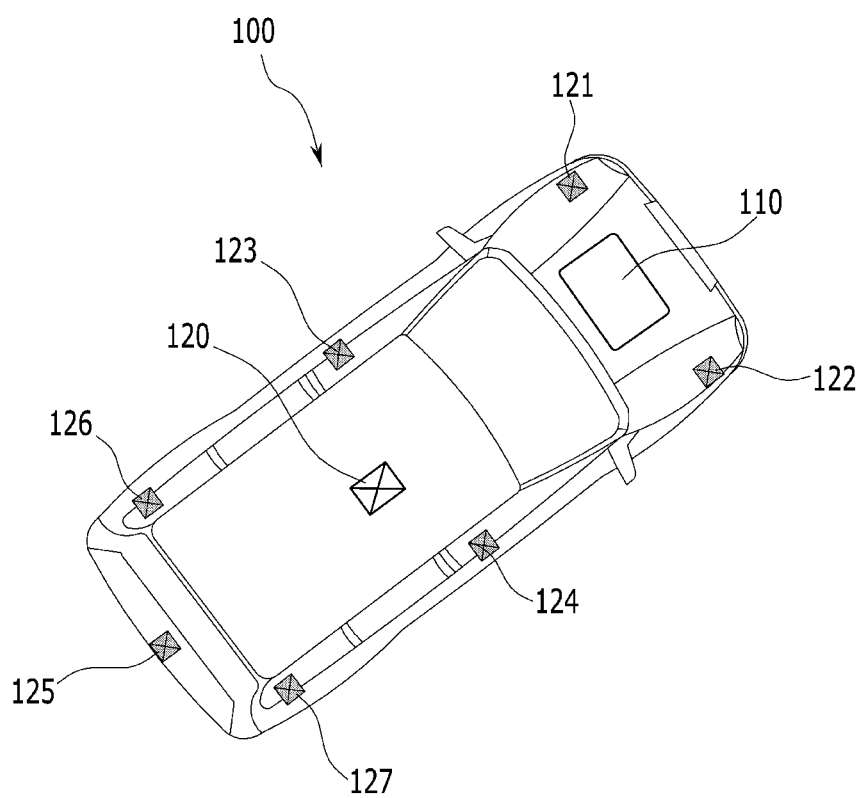
FIG. 1 shows a wireless charging vehicle according to an embodiment of the present invention.

The embodiments of the present invention will be described more fully hereinafter with reference to the accompanying drawings, in which embodiments of the invention are shown. As those skilled in the art would realize, the described embodiments may be modified in various different ways, all without departing from the spirit or scope of the present invention.

The drawings and description are to be regarded as illustrative in nature and not restrictive, and like reference numerals designate like elements throughout the specification.

Unless explicitly described to the contrary, the word "comprise" and variations such as "comprises" or "comprising" will be understood to imply the inclusion of stated elements but not the exclusion of any other elements.

A wireless charging vehicle will now be described with reference to FIG. 1, a wireless charging station will now be described with reference to FIG. 2, and a wireless charging method of a wireless charging vehicle will now be described with reference to FIGS. 3 to 7.

FIG. 1 shows a wireless charging vehicle according to an embodiment of the present invention.

Referring to FIG. 1, the wireless charging vehicle 100 includes a secondary charging pad 110, a UWB controller 120, and a plurality of UWB tags 121, 122, 123, 124, 125, 126, and 127. The wireless charging vehicle 100 may include vehicles requiring an electrical charging such as electric vehicles, autonomous vehicles, or hybrid vehicles.

The secondary charging pad 110 may generate an induced current by the magnetic field generated by a primary charging pad 210 to be described with reference to FIG. 2 and may charge the battery of the wireless charging vehicle 100. The secondary charging pad 110 may be disposed on a lower part of the vehicle so that it may have an appropriate gap with the primary charging pad 210 in the case of charging the battery. The secondary charging pad 110 is shown to be disposed at a front portion of the wireless charging vehicle 100 in FIG. 1, and the position of the secondary charging pad 110 is not limited thereto.

The UWB tags 121, 122, 123, 124, 125, 126, and 127 represent sensors for measuring distances and directions by using a UWB method that is a short-distance wireless communication protocol. When the wireless charging vehicle 100 is seen from the top (in a plan view), the UWB tags 121, 122, 123, 124, 125, 126, and 127 may be disposed to surround the wireless charging vehicle 100.

As exemplified above, the first UWB tag 121 may be disposed at a front left of the wireless charging vehicle 100, the second UWB tag 122 may be disposed at a front right of the wireless charging vehicle 100, the third UWB tag 123 may be disposed at a middle left of the wireless charging vehicle 100, the fourth UWB tag 124 may be disposed at a middle right of the wireless charging vehicle 100, the fifth UWB tag 125 may be disposed at a rear middle of the wireless charging vehicle 100, the sixth UWB tag 126 may be disposed at a rear left of the wireless charging vehicle 100, and the seventh UWB tag 127 may be disposed at a rear right of the wireless charging vehicle loft Positions and numbers of the UWB tags 121, 122, 123, 124, 125, 126, and 127 are not limited, the UWB tags 121, 122, 123, 124, 125, 126, and 127 may be disposed on many positions if needed, and may be added or deleted when required.

The UWB controller 120 performs a wireless charging arrangement mode by using sensor values measured by the UWB tags 121, 122, 123, 124, 125, 126, and 127. The wireless charging arrangement mode may be described in a later part of the present specification with reference to FIG. 3 to FIG. 7.

Figure 2:
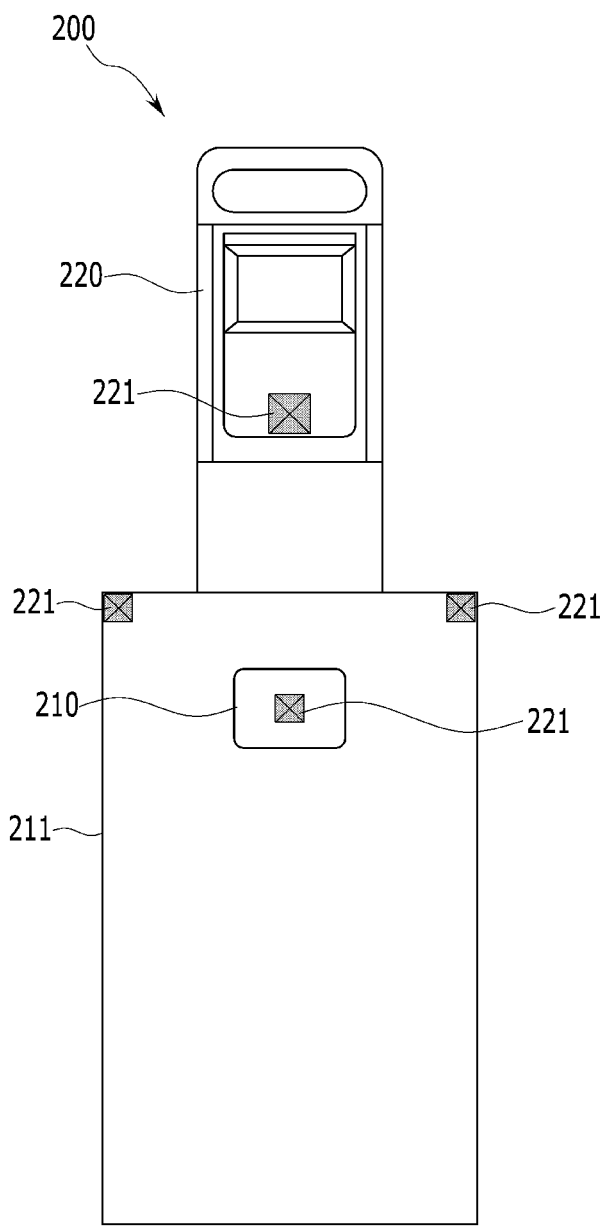
FIG. 2 shows a wireless charging station according to an embodiment of the present invention.

FIG. 2 shows a wireless charging station according to an embodiment of the present invention.

Referring to FIG. 2, the wireless charging station 200 includes a primary charging pad 210, a wireless charger 220, and at least one UWB anchor 221.

The primary charging pad 210 may receive a power voltage of the grid or the energy storage device and may generate a magnetic field for charging the wireless charging vehicle 100. The primary charging pad 210 may be disposed on a ground of a parking lot 211 so that it may face the secondary charging pad 110 of the wireless charging vehicle 100 in the parking lot 211.

The wireless charger 220 may control the power voltage provided to the primary charging pad 210, and may provide charging information of the wireless charging vehicle 100 to the user.

At least one UWB anchor 221 may periodically transmit a UWB signal for inducing a charging position of the wireless charging vehicle 100 or may transmit the UWB signal according to a request of the wireless charging vehicle 100. At least one UWB anchor 221 may be disposed on at least one edge of the primary charging pad 210, the wireless charger 220, and the parking lot 211. At least one UWB anchor 221 may be disposed on an appropriate position for inducing a charging position of the wireless charging vehicle 100, and the position of the UWB anchor 221 is not limited.

Figure 3:
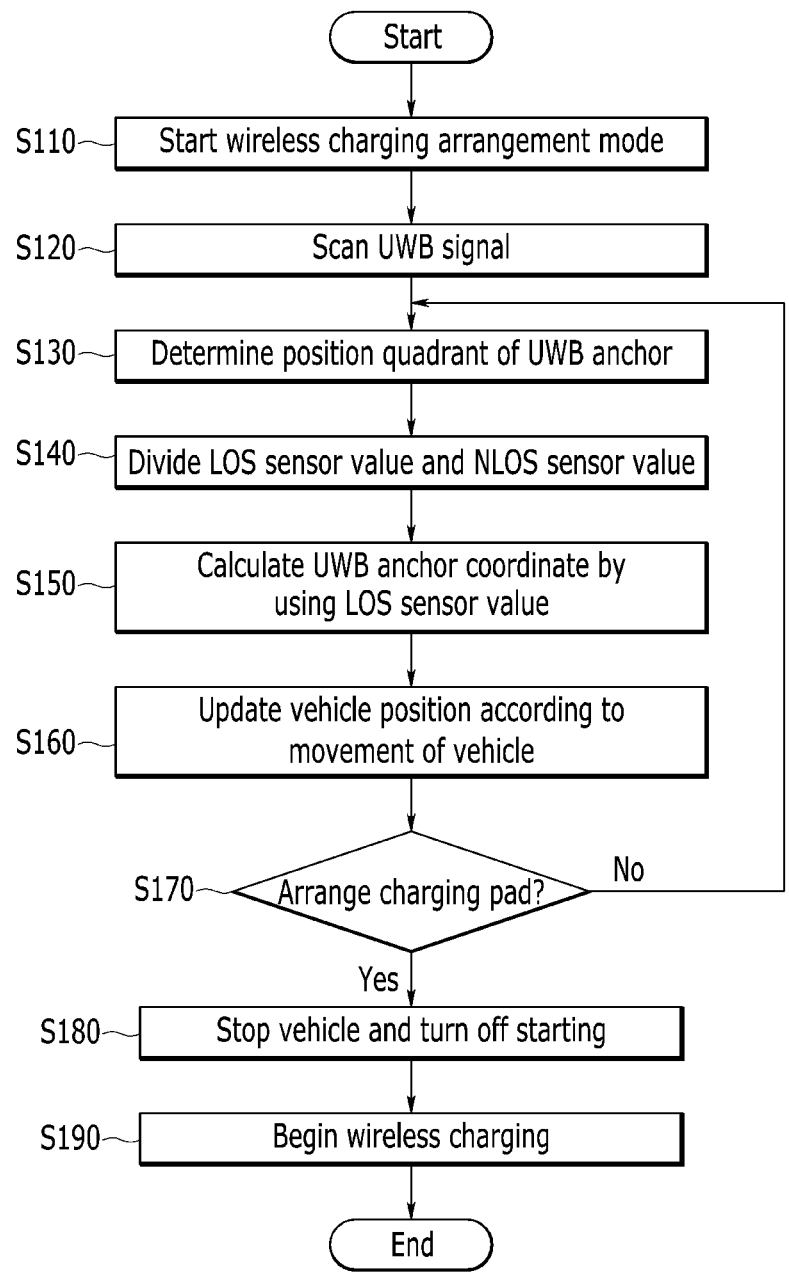
FIG. 3 shows a flowchart of a wireless charging method of a wireless charging vehicle according to an embodiment of the present invention.
Figure 4:
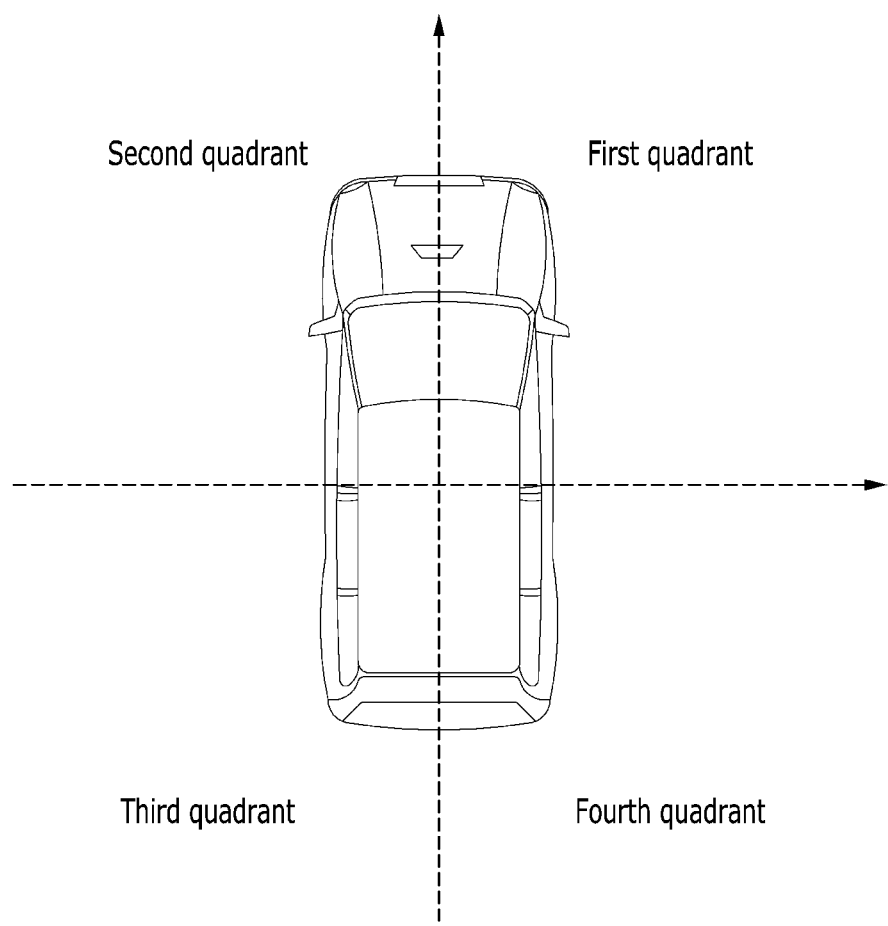
FIG. 4 shows a quadrant for determining a position quadrant of a UWB anchor according to an embodiment of the present invention.
Figure 5:
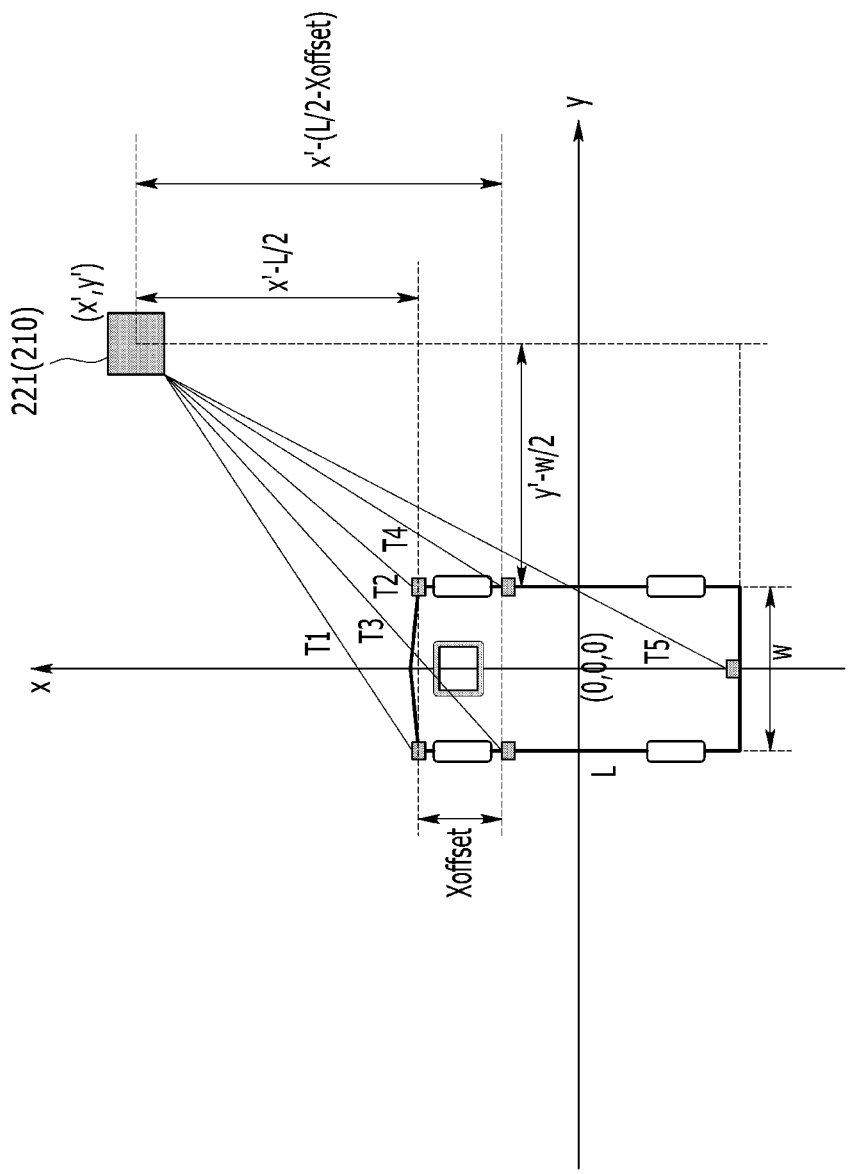
FIG. 5 shows a method for calculating a coordinate of a UWB anchor according to an embodiment of the present invention.
Figure 6:
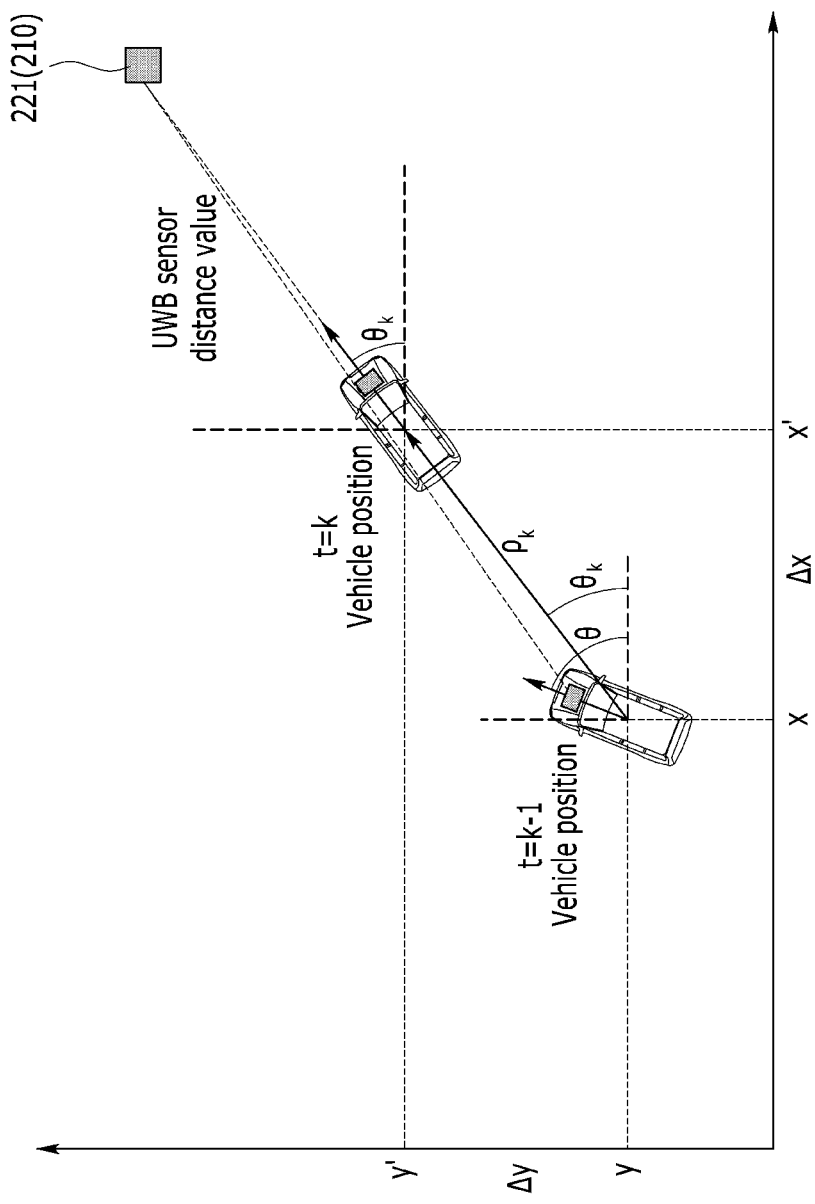
FIG. 6 shows a method for updating a vehicle position according to a movement of a vehicle according to an embodiment of the present invention.

FIG. 3 shows a flowchart of a wireless charging method of a wireless charging vehicle according to an embodiment of the present invention. FIG. 4 shows a quadrant for determining a position quadrant of a UWB anchor according to an embodiment of the present invention. FIG. 5 shows a method for calculating a coordinate of a UWB anchor according to an embodiment of the present invention. FIG. 6 shows a method for updating a vehicle position according to a movement of a vehicle according to an embodiment of the present invention.

Referring to FIG. 3 to FIG. 6, the UWB controller 120 of the wireless charging vehicle 100 starts a wireless charging arrangement mode (S110). The wireless charging arrangement mode represents a process for arranging the secondary charging pad 110 of the wireless charging vehicle 100 on the primary charging pad 210 of the wireless charging station 200.

The UWB controller 120 scans the UWB signal transmitted by the UWB anchor 221 by using the UWB tags 121, 122, 123, 124, 125, 126, and 127 (S120).

The UWB controller 120 may compare intensities (i.e., received signal strength indicators (RSSI) of the UWB signals received by the respective UWB tags 121, 122, 123, 124, 125, 126, and 127 and distance values and may determine a position quadrant on which the UWB anchor 221 of the primary charging pad 210 is positioned (S130). As exemplified in FIG. 4, the quadrant is set with reference to a front progressing direction of the wireless charging vehicle 100, and the position quadrant may be determined to be one of the quadrants that are set with respect to the wireless charging vehicle 100.

In detail, the UWB controller 120 may compare the UWB signal intensity of the third UWB tag 123 disposed on the middle left of the wireless charging vehicle 100 and the distance value and the UWB signal intensity of the fourth UWB tag 124 disposed on the middle right of the wireless charging vehicle 100 and the distance value and may determine whether the UWB anchor 221 is positioned on the right or the left of the wireless charging vehicle 100. The UWB controller 120 may compare one of the UWB signal intensities of the first UWB tag 121 and the second UWB tag 122 disposed at the front of the wireless charging vehicle 100 and the distance value and the UWB signal intensity of the fifth UWB tag 125 disposed at the rear of the wireless charging vehicle 100 and the distance value and may determine whether the UWB anchor 221 is positioned on the front side or the rear side of the wireless charging vehicle 100. The UWB controller 120 may combine the two above-noted results and may determine on which quadrant the UWB anchor 221 of the primary charging pad 210 is positioned.

The UWB controller 120 divides a line of sight (LOS) sensor value and a non-line of sight (NLOS) sensor value based on the determined quadrant (S140). The UWB controller 120 may determine the UWB tag having obtained the LOS with respect to the determined quadrant to be a LOS sensor, and may determine the UWB tag not having obtained the LOS with respect to the determined quadrant to be an NLOS sensor. The UWB controller 120 may use the LOS sensor value of the LOS sensor so as to reduce an error caused by the NLOS sensor value of the NLOS sensor.

The UWB controller 120 calculates a coordinate of the UWB anchor 221 by using the LOS sensor value (S150). The UWB controller 120 may calculate a relative coordinate of the UWB anchor 221 with respect to the wireless charging vehicle 100. For example, as shown in FIG. 5, when the UWB anchor 221 of the primary charging pad 210 is positioned in the first quadrant, and the distance values (T1, T2, T3, T4, and T5) of the five UWB tags are measured, the UWB controller 120 may calculate a coordinate (x',y') of the UWB anchor 221 by using the distance values (T1, T2, and T4) corresponding to the LOS sensor values as expressed in Equation 1.

$$T_1^2 = (y' + w/2)^2 + (x' - L/2)^2$$
$$T_2^2 = (y' - w/2)^2 + (x' - L/2)^2$$
$$T_4^2 = (y' - w/2)^2 + (x' - (L/2 - Xoffset))^2$$
$$X' = \frac{T_4^2 - T_2^2 + Xoffset * L - Xoffset^2}{2Xoffset}$$
$$y' = \frac{T_1^2 - T_2^2}{2W}$$

Equation 1

Here, L is a vehicle length, w is a vehicle width, and Xoffset is a distance between lateral UWB tags. A z-axis coordinate of the UWB anchor 221 is omitted for ease of description.

As the coordinate of the UWB anchor 221 is calculated, the wireless charging vehicle 100 may move toward the UWB anchor 221 of the primary charging pad 210 with respect to the coordinate of the UWB anchor 221.

The UWB controller 120 may update the vehicle position according to movement of the wireless charging vehicle 100 (S160). As exemplified in FIG. 6, the UWB controller 120 may update the vehicle position by using odometry information caused by the movement of the vehicle. The odometry information may be obtained from a wheel speed sensor and a yaw rate sensor, and the UWB controller 120 may estimate the vehicle position by using the wheel speed sensor value and the yaw rate sensor value. The vehicle position may be updated as expressed in Equation 2.

$$\begin{bmatrix} x' \\ y' \\ \theta' \end{bmatrix} = \begin{bmatrix} x + \rho\cos(\theta k) \\ y + \rho\sin(\theta k) \\ \theta k \end{bmatrix}$$

Equation 2

Here, x,y is a vehicle position at a previous time (t=k−1), x',y' is a vehicle position at a present time (t=k), p is a vehicle traveling distance, and θ is a yaw.

The vehicle position estimated by using odometry information may have errors, so the UWB controller 120 may correct the errors of the vehicle position with the LOS sensor value (a UWB sensor distance value). That is, the UWB controller 120 may update the vehicle position by combining the odometry information and the LOS sensor value. As the UWB controller 120 uses the LOS sensor value having acquired the LOS, accuracy of the distance value may be increased, and the error of the vehicle position may be minimized.

The UWB controller 120 determines whether the charging pad is arranged so that the wireless charging vehicle 100 may move and the primary charging pad 210 may face the secondary charging pad 110 (S170). When the charging pad is not arranged, the UWB controller 120 repeats the steps of S130 to S160 to thus arrange the charging pad.

When the charging pad is arranged, the UWB controller 120 finishes the wireless charging arrangement mode, the wireless charging vehicle 100 may stop and turn off the starting (OFF) (S180), and may begin wireless charging (S190).

As described above, the wireless charging vehicle 100 may find the position of the primary charging pad 210 of the wireless charging station 200 in the remote distance by using the UWB skill, and the secondary charging pad 110 of the wireless charging vehicle 100 may be precisely arranged on the primary charging pad 210 together with an automatic parking function and an autonomous function of the wireless charging vehicle 100, thereby optimizing the wireless charging efficiency.

A wireless charging method of a wireless charging vehicle 100 using a particle filter scheme will now be described with reference to FIG. 7. Differences will be described in comparison to the characteristics described with reference to FIG. 3 to FIG. 6.

FIG. 7 shows a flowchart of a wireless charging method of a wireless charging vehicle according to another embodiment of the present invention.

Referring to FIG. 7, the UWB controller 120 begins the wireless charging arrangement mode (S210, and searches the UWB anchor 221 (S215).

The UWB controller 120 may sample UWB sensor values for UWB signal intensities received by the respective UWB tags 121, 122, 123, 124, 125, 126, and 127 and the distance values (S220).

The UWB controller 120 may estimate the position quadrant of the UWB anchor 221 by using the sampled UWB sensor value (S225). The UWB controller 120 may compare the UWB sensor values of the respective UWB tags 121, 122, 123, 124, 125, 126, and 127 surrounding the wireless charging vehicle 100 in a plan view and may estimate the position quadrant in which the UWB anchor 221 is positioned.

The UWB controller 120 calculates the coordinate of the UWB anchor 221 with reference to the wireless charging vehicle 100 by using the LOS sensor value of the LOS sensor with the LOS from among the UWB tags 121, 122, 123, 124, 125, 126, and 127 (S230). The coordinate of the UWB anchor 221 may be calculated as expressed in Equation 1.

As the coordinate of the UWB anchor 221 is calculated, the wireless charging vehicle 100 may move toward the UWB anchor 221 of the primary charging pad 210 based on the coordinate of the UWB anchor 221.

The UWB controller 120 may estimate and update the position of the moving wireless charging vehicle 100 by using an extended Kalman filter (EKF) for estimating the position of a nonlinear system and a particle filter scheme for estimating the position of the vehicle.

In detail, the UWB controller 120 may predict a particle position by using odometry information (S235), may collect an actually measured value of the UWB sensor value (LOS sensor value) (S240), and may preprocess the UWB sensor value and update the particle weight value (S245). The UWB controller 120 may resample particles (S250), and may update the position of the UWB anchor 221 by applying an updated particle weight value (S255). The UWB controller 120 may determine whether the charging pad is arranged (S260), and if not, may repeat the steps of S220 to S255 to find the particle with the highest weight value by using the extended Kalman filter.

When the charging pad is finished arranging, the UWB controller 120 may finish the wireless charging arrangement mode, and the wireless charging vehicle 100 may stop and turn off the starting (OFF) (S265), and may begin the wireless charging (S270).

The accompanying drawings and the embodiments of the present invention are only examples of the present invention, and are used to describe the present invention but do not limit the scope of the present invention as defined by the following claims. Therefore, those having ordinary skill in the art will appreciate that various modifications or changes and other equivalent embodiments are possible from the embodiments. Therefore, the technical scope of the present invention may be defined by the technical idea of the following claims.

What is claimed is:

1. A wireless charging vehicle, the vehicle comprising:
a secondary charging pad configured to generate an induced current by a magnetic field generated by a primary charging pad of a wireless charging station and to charge a battery;
a plurality of ultra-wideband (UWB) tags disposed to surround the vehicle; and
a UWB controller configured to perform a wireless charging arrangement mode for arranging the secondary charging pad on the primary charging pad by using a sensor value measured by the UWB tags, wherein the UWB controller is configured to calculate a coordinate of the primary charging pad by using two or more line of sight (LOS) sensor values of the UWB tags having a line of sight from among the UWB tags, a length of the vehicle, a width of the vehicle, and a distance between lateral UWB tags, wherein
the UWB controller is configured to predict a particle position by using odometry information, collect actually measured value of the LOS sensor values, preprocess the LOS sensor values, update a particle weight value, resample particles, update a position of a UWB anchor by applying the updated particle weight value, and find a particle with the highest particle weight value,
the UWB controller is configured to scan UWB signals transmitted by UWB anchors disposed on the primary charging pad, a wireless charger of the wireless charging station, and a parking lot, and
the UWB anchors are configured to transmit the UWB signals according to a request of the wireless charging vehicle.

2. The vehicle of claim 1, wherein the UWB controller is configured to:
compare UWB signals of the UWB tags;
determine a position quadrant in which the primary charging pad is disposed; and
distinguish the UWB tag having the line of sight and a UWB tag not having the line of sight from among the UWB tags based on the position quadrant.

3. The vehicle of claim 1, wherein the UWB controller is configured to combine the odometry information and a LOS sensor value according to movement of the vehicle to update a vehicle position.

4. The vehicle of claim 3, wherein the UWB controller is configured to update the vehicle position by using an extended Kalman filter and a particle filter scheme.

5. The vehicle of claim 1, wherein the secondary charging pad is disposed on a lower part of the vehicle.

6. The vehicle of claim 1, wherein the plurality of UWB tags are disposed at a front left of the vehicle, a front right of the vehicle, a middle left of the vehicle, a middle right of the vehicle, a rear middle of the vehicle, a rear left of the vehicle, and a rear right of the vehicle.

7. The vehicle of claim 1, wherein the vehicle comprises an electric vehicle, an autonomous vehicle, or a hybrid vehicle.

8. The vehicle of claim 1, wherein the wireless charging station comprises the primary charging pad, the wireless charger, and the UWB anchor.

9. The vehicle of claim 8, wherein the wireless charger is configured to control a power voltage provided to the primary charging pad and to provide charging information of the vehicle to a user of the vehicle.

10. A wireless charging method of a wireless charging vehicle, the method comprising:
scanning ultra-wideband (UWB) signals transmitted by UWB anchors disposed on a primary charging pad, a wireless charger of a wireless charging station, and a parking lot;
comparing (UWB) the UWB signals received by a plurality of UWB tags and determining a position quadrant in which a UWB anchor is disposed;
calculating a coordinate of the UWB anchor by using two or more line of sight (LOS) sensor values of UWB tags having a line of sight based on the position quadrant from among the plurality of UWB tags, a length of the vehicle, a width of the vehicle, and a distance between lateral UWB tags;
predicting a position of a particle using odometry information;
collecting actually measured value of the LOS sensor values;
preprocessing the LOS sensor values;
updating a particle weight value;
resampling particles;
updating a position of the UWB anchor by applying the updated particle weight value and finding the particle with the highest particle weight value;
moving toward the UWB anchor based on the coordinate of the UWB anchor;
determining that a secondary charging pad is arranged with the primary charging pad for charging;
controlling a power voltage provided to the primary charging pad; and
providing charging information of the vehicle to a user of the vehicle, wherein the UWB anchors transmit the UWB signals according to a request of the wireless charging vehicle.

11. The method of claim 10, further comprising combining the odometry information according to movement of the vehicle and a LOS sensor value and updating a vehicle position.

12. The method of claim 11, wherein the odometry information is obtained from a wheel speed sensor and a yaw rate sensor.

13. The method of claim 11, wherein the vehicle position is updated by using an extended Kalman filter and a particle filter scheme.

14. The method of claim 10, further comprising dividing the LOS sensor value and a non-line of sight (NLOS) sensor value based on the determined position quadrant.

15. The method of claim 10, wherein the plurality of UWB tags are disposed to surround the vehicle.

16. A wireless charging method of a wireless charging vehicle, the method comprising:
 beginning a wireless charging arrangement mode;
 scanning ultra-wideband (UWB) signals transmitted by UWB anchors disposed on a primary charging pad, a wireless charger of a wireless charging station, and a parking lot;
 searching for an ultra-wideband (UWB) anchor;
 sampling UWB sensor values for UWB signal intensities received by UWB tags disposed on the vehicle and distance values;
 estimating a position quadrant of the UWB anchor based on a comparison of the UWB sensor values;
 calculating a coordinate of the UWB anchor with reference to the vehicle by using two or more line of sight (LOS) sensor values of the UWB tags having LOS sensor values from among the UWB tags, a length of the vehicle, a width of the vehicle, and a distance between lateral UWB tags;
 predicting a position of a particle using odometry information;
 collecting actually measured value of the LOS sensor values;
 preprocessing the LOS sensor values;
 updating a particle weight value;
 resampling particles;
 updating a position of the UWB anchor;
 moving the vehicle toward the UWB anchor based on the updated position of the UWB anchor by applying the updated particle weight value and finding the particle with the highest particle weight value;
 determining that a secondary charging pad disposed on the vehicle is arranged with respect to the primary charging pad disposed on a parking surface;
 stopping and turning off the vehicle;
 beginning wireless charging of the vehicle;
 controlling a power voltage provided to the primary charging pad; and
 providing charging information of the vehicle to a user of the vehicle, wherein the UWB anchors transmit the UWB signals according to a request of the wireless charging vehicle.

17. The method of claim 16, wherein the vehicle comprises an electric vehicle, an autonomous vehicle, or a hybrid vehicle.

18. The method of claim 16, further comprising:
 comparing UWB signals of the UWB tags;
 determining a position quadrant in which the primary charging pad is disposed; and
 distinguishing the UWB tag having the line of sight and a UWB tag not having the line of sight from among the UWB tags based on the determined position quadrant.

19. The method of claim 16, further comprising:
 combining the odometry information and a LOS sensor value according to movement of the vehicle to update a vehicle position.

20. The method of claim 19, further comprising:
 updating the vehicle position using an extended Kalman filter and a particle filter scheme.

* * * * *